July 11, 1972  M. E. McLEOD ET AL  3,676,105
RECOVERY OF METAL FROM DROSS
Filed Jan. 8, 1971
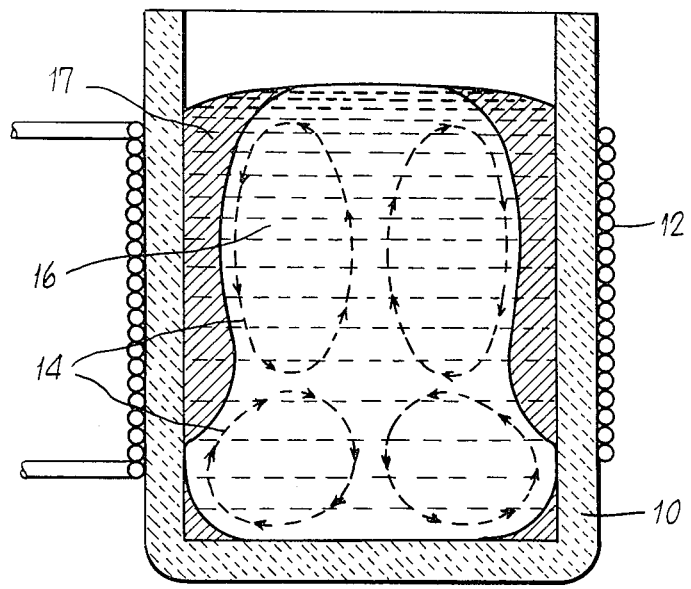
MELVIN ELLIOTT McLEOD
JOHN EDWARD DEUTSCHMAN
HERBERT WARREN PERCIVAL
HAN SPOEL
INVENTORS
BY
Christopher C. Dunham
ATTORNEY United States Patent Office 3,676,105
Patented July 11, 1972

3,676,105
RECOVERY OF METAL FROM DROSS
Melvin Elliott McLeod, Arvida, Quebec, Canada, John Edward Deutschman, Mandeville, Jamaica, West Indies, and Herbert Warren Percival, Beaconsfield, Quebec, and Hans Spoel, St. Cesaire, Quebec, Canada, assignors to Alcan Research and Development Limited, Montreal, Quebec, Canada
Filed Jan. 8, 1971, Ser. No. 105,025
Int. Cl. C22b 7/00, 21/00
U.S. Cl. 75—68 R
16 Claims

ABSTRACT OF THE DISCLOSURE

Procedure for treating dross from a molten aluminum surface to recover free metal contained in the dross by heating the dross in an induction furnace in the presence of a salt flux. Preferably, the dross is initially rapidly quenched upon removal from the molten surface, to maintain a high free metal content in the dross. With a heel of molten aluminum established in the induction furnace, a substantial proportion of the flux is added, and the dross is then fed to the melt in successive increments which may be interspersed with further additions of flux. Heat and fluid circulation caused by induced currents in the melt and by the electromagnetic field effect separation and coalescence of free metal from the dross.

BACKGROUND OF THE INVENTION

This invention relates to procedures for recovering metal from dross, and in an important specific aspect is particularly directed to a method of recovering aluminum metal from dross containing the same. As herein used, the term aluminum includes aluminum base alloys.

When a body of aluminum is melted or maintained in molten state in a furnace, for purposes such as casting, dross forms on the surface of the molten metal. The dross is periodically removed by skimming or like operations. As thus removed, the dross is typically a pasty or granular material, at or above the temperature of the furnace, containing a substantial amount of free aluminum metal as well as aluminum oxide and other nonmetallic compounds.

For reasons of economy, it is desirable to recover in usable form as much as possible of the free metal that is carried from the furnace in the dross. However, separation of the metal is difficult, because the metal is dispersed through the dross as fine particles or globules in intimate mixture with and surrounded by the nonmetallic components of the dross. Further, the free metal in the more or less porous dross is highly susceptible to oxidation, especially at elevated temperatures. In particular, the dross at furnace temperature very commonly tends to ignite and to burn; such burning rapidly decreases the recoverable free metal content of the dross.

Heretofore it has been proposed to recover metal from aluminous dross by rapidly quenching the dross, milling it, and screening the resultant particles to selectively obtain the larger size fractions. It has also been proposed to separate the metallic and nonmetallic portions of the dross by heating and mechanically mixing the dross with a heel of molten metal or a molten salt flux, the heat being supplied either from an external heater or by application of a direct flame. In one such procedure, a mixture of dross and salt flux is tumbled in a rotary furnace and heated by direct flame.

Stated in general, these previously proposed procedures have been characterized by relatively low percentage recoveries of free metal, and by operational difficulties or inefficiencies of various kinds. Thus, the milling and screening method does not afford recovery of the significant quantities of free metal that are contained in the fine particle size fractions. In the heating and mixing procedures, provision of mechanical mixing is inconvenient, and tends to leave at least some metal entrained in the nonmetallic components and/or in the salt flux. Also, while indirect heating is inefficient owing to the poor heat conductivity of the dross, direct flame heating frequently causes at least localized burning of the dross and resultant decrease in free metal content. A further problem encountered in use of salt fluxes with known heating techniques is that volatilization of the salt may introduce hazardous contaminants to the atmosphere unless special care is taken to collect and remove such contaminants.

SUMMARY OF THE INVENTION

An object of the present invention is to provide operationally simple, safe and convenient procedures for recovering free metal from dross, affording improved percentage recoveries of the free metal content of the dross. A further object is to provide such procedures for recovering metal from dross containing aluminum.

To these and other ends, the invention broadly contemplates heating a metal-containing dross by electrical induction in the presence of a salt flux for effecting separation of contained free metal from the nonmetallic portion of the dross. In an important aspect, the invention contemplates such treatment of aluminum-containing dross. The flux, which may be a mixture of salts selected to have a melting point below the operating temperature to which the dross is heated, and a density at least somewhat different from molten aluminum, is used in an amount at least about equal to the amount (by weight) of nonmetallics present in the dross. It is presently preferred that the amount of flux employed be equal to about twice the weight of nonmetallics in the dross.

In accordance with particular features of the invention, in specific embodiments thereof, the induction heating of the dross may be performed in a so-called coreless induction furnace, in which there may be initially established a heel of molten aluminum. To the heel there may be added a substantial proportion of the flux that is to be employed, and thereafter the dross is fed to the melt in successive increments, interspersed as necessary with further additions of flux. Throughout this succession of steps, the induction furnace is ordinarily continuously operated, i.e. by passage of alternating current through a coil surrounding a vessel containing the melt.

Passage of the current through the coil generates eddy currents in the melt, and it is the resistance of the melt to these eddy currents that produces heat therein, sufficient to maintain the heel in molten state and to melt the salt flux and the free metal of the dross. The eddy currents also cause fluid circulation within the melt, largely or entirely obviating the need for mechanical mixing or agitation of the metal-flux-dross mixture. The nonmetallics of the dross are carried with the flux, while the free metal of the dross, under the influence of the electromagnetic field in the furnace, coalesces with the heel. Notwithstanding the circulation produced by the eddy currents, excellent separation is maintained within the furnace between the molten metal and the mixture of flux and nonmetallic components of the dross. The flux and nonmetallics are removed from the furnace, and the collected metal may be withdrawn from the furnace in any suitable manner for casting into ingots or other use.

With the described procedure, recoveries as high as 95% of the initial free metal content of the dross are obtained. Use of induction heating, preferably with an alternating current of low frequency passed through the furnace coil, affords effective heating of the charge without danger of dross ignition. Moreover, it is found that at least at ordinary operating temperatures (below about 825° C.), there is little if any volatilization of salts from the flux, and in consequence there is no problem of hazardous atmospheric contamination.

For convenience of operation, it is ordinarily preferred to introduce a major proportion (i.e. more than 50% by weight) of the total required flux into the furnace prior to introduction of any dross. Among the advantages of such operation are the saving of time that results from melting of the flux while the furnace is heating up. At the start of a furnace cycle, the heel of molten metal is usually at a temperature very substantially lower than that at which it is desired to operate the furnace, but this temperature is also commonly higher than the melting point of the flux and hence a large quantity of flux may be melted while the furnace is being raised to its operating temperature. In any event, as or before any dross is added to the furnace, there should be present in the furnace, in molten state, a quantity of flux preferably equal to about two times the amount of oxide present in the amount of dross to be added; hence it will be apparent that premelting of a large quantity of the flux expedites the operation during the stage of heating the dross, in avoiding delays that would otherwise be necessary to await melting of the flux between introduction of successive increments of dross. Moreover, where the furnace is used for successive cycles of dross-treating operation, the addition of a substantial quantity of flux at the start of a cycle aids in cleansing the furnace of any dross that may remain therein from the previous cycle of operation.

When a heel of molten metal is used in the furnace, it is presently believed that heating of the dross added thereto may occur largely or even primarily through heat transfer to the dross from the molten metal heel rather than by the direct effect of the electrical induction on the dross itself. The heel, of course, is heated by electrical induction in the manner already set forth. As used herein, references to electrical induction heating of the dross will be understood to include operations wherein the dross is actually heated through an indirect effect of electrical induction, as by transfer of heat from a heel of metal which is itself heated by electrical induction.

In the preferred practice of the invention just described, the weight of metal heel required for satisfactory operation of a given furnace is inversely proportional to the frequency of the alternating current supplied to the furnace coil. It is ordinarily preferable that that current be a relatively low frequency current, one exemplary value of such current being 180 Hz. If very much higher frequencies are used, for example on the order of 10,000 Hz., use of a heel is unnecessary; i.e. it is found that an adequate heating effect occurs simply by placing a mixture of the dross and salt flux in a suitable induction furnace supplied with such high frequency current, apparently because eddy currents induced in individual particles or globules of the metal in the dross provide such heating effect. However, with increase in frequency of the supplied current, the depth of penetration of the field thus created is reduced, and hence in high frequency operation, dimensions of the furnace must be far smaller than in the case of low frequency operation.

Further in accordance with the invention, it is preferred that the steps of withdrawing the dross from the smelting furnace or other locality where it is formed and transferred it to the induction furnace (with or without intervening storage) be so performed as to maintain the free metal content of the dross at least above about 50% and preferably above about 60%, all percentages herein being given by weight. This may be done, for example, by transferring the dross very rapidly to the induction furnace after removing the dross from the smelting furnace by skimming. The rapid transfer minimizes loss of free metal by oxidation before the dross is received in the induction furnace. Alternatively, and in most cases preferably, the dross should be quenched (i.e. cooled) rapidly and continuously, immediately after skimming, to a temperature substantially below the melting point of aluminum and preferably at least below about 500° C. Such quenching again minimizes oxidation and avoids the possibility that the dross may ignite and burn.

Further features and advantages of the invention will be apparent from the detailed description hereinbelow set forth, together with the accompanying drawing.

BRIEF DESCRIPTION OF THE DRAWING

The figure is a schematic elevational sectional view of a coreless induction furnace in which the heating step of the present method may be performed, illustrating features of that step.

DETAILED DESCRIPTION

The method of the present invention may be described as applied to the treatment of the dross that forms on a surface of molten aluminum (i.e. pure metal or aluminum base alloy), as in a furnace where the aluminum is being maintained in molten state for casting or other purposes. It is found that such dross, as removed from the molten aluminum surface, typically contains about 60 to about 85% free metal in mixture with aluminum oxide and other nonmetallic compounds including up to about 2% each of nitrides, carbides and fluorides. The removed dross is usually a pasty or granular material, which may, however, harden into large, more or less rigid masses upon cooling.

In accordance with the invention, for recovering free metal, the dross is heated by induction (i.e. directly, or indirectly through heat transfer from a heel of molten metal heated by induction, as explained above) to a temperature above the melting point of the metal in the presence of a salt flux. Stated generally, the flux is a salt or mixture of salts having a melting point lower than the operating temperature to which the dross is heated, e.g. a melting point in the range of about 600° to about 700° C., and having a density such as to facilitate separation of the flux in molten state from molten aluminum. The purposes of the flux are to cover and thus protect the free metal of the dross against oxidation that would or might occur on exposure of the metal to air, and to assist in separation of the free metal from the nonmetallic components of the dross. The amount of flux employed, for treatment of a particular quantity of dross having a predetermined composition, is at least equal in weight to the nonmetallic content of the dross, it is presently preferred to use an amount of flux approaching, or equal to, about twice the weight of the nonmetallics in the dross. The flux, to be effective, must be present in molten state; and the values just given are to be understood as representing the ratio of flux in molten state to the oxide content of the dross under treatment. In one specific illustrative example, a molten flux-to-oxide ratio of 1.8 to 1 (by weight) is found to be satisfactory.

Presently preferred fluxes include mixtures of chlorides and fluorides of elements of Groups I and I-A, II and II-A, and III of the periodic Table of Elements. One specific example of a satisfactory flux comprises 45% potassium chloride, 50% sodium chloride, and 5% sodium fluoride, all percentages being by weight. In this flux, the sodium chloride-potassium chloride ratio is eutectic while the sodium fluoride further depresses the melting point. The purpose of the fluoride is to provide wetting of the oxides surrounding the particles or globules of free aluminum metal in the dross, and to attack the oxide surface coatings of these particles or globules. The melting point of the described flux is between about 650 and 670° C., which is satisfactorily below the temperature to which the dross is heated.

By way of further specific illustration of suitable flux compositions for the practice of the present method, calcium fluoride may be used in place of the sodium fluoride in the above-described mixture of salts. Indeed, since fluorides are commonly present in the dross, the advantages of inclusion of fluoride in the flux may often be realized even if there is no fluoride in the flux composition per se. A further suitable mixture is a naturally occurring salt, commercially available under the trade name "Montanal," which typically contains 66% sodium chloride, 29% potassium chloride, and 2% fluoride. The melting point of the latter salt is about 670 to 680° C., which is again satisfactorily below that to which the dross is heated in the present process.

One suitable known form of induction furnace in which the heating step of the present method may be performed is the coreless induction furnace illustrated schematically in the figure. This furnace comprises an axially vertical cylindrical refractory crucible 10 surrounded concentrically by a conductive coil 12 formed for example of copper tubing. As alternating current is passed through the coil 12 from a suitable source (not shown) a coolant such as water may be circulated through the coil to cool it. The charge of material to be heated in the furnace is placed within the crucible.

As will be understood, an induction furnace of the type described, having a charge of molten metal in the crucible, may be regarded as an electrical transformer with the power coil being the primary and the charge in the crucible the secondary of the transformer. When an alternating current supply is connected to the power coil, the current generates an alternating magnetic flux which cuts through the cylindrical mass of metal constituting the charge and in turn generates eddy currents in that mass. The charge is heated by resistance heating effects resulting from these eddy currents, such heating being independent of the magnetic nature of the charge but dependent on the resistivity of the charge. Also, the power (heat) output of the furnace increases with increase in the size of the charge present in the crucible.

The charge contained in the crucible in the practice of the present method includes molten aluminum metal, nonmetallic components of the dross, and molten salt flux. Essentially, it is the resistance of the molten metal to the generated eddy currents that heats the charge. The eddy currents generated in the mass of metal are roughly concentric to the principal (vertical) axis of the crucible and give rise to their own alternating flux. The presence of this eddy current magnetic flux in addition to that generated by the alternating current passed through the power coil produces an effect similar to that of opposing two like poles of permanent magnets: there is created a mechanical repulsion force having its greatest intensity at the center of the opposing fields. The unevenly distributed force applied on the molten metal column (i.e. the charge) within the crucible exerts a pinching effect on the molten metal column, and the combination of this pinching effect with gravity produces in the charge the pattern of fluid circulation indicated by the arrows 14 in the figure. As hereinafter further explained, the illustrated fluid circulation, resulting from the eddy currents, in many instances provides sufficient agitation or stirring of the mixture of salts, dross and metal in the crucible so that no mechanical agitation or stirring is required.

Preferably, and especially for operations on a substantial scale in a furnace of the type illustrated, a relatively low frequency alternating current is supplied to the power coil 12. The depth of penetration of the coil field into the charge within the crucible (and hence, in a practical sense, the dimensions and capacity of a furnace of the illustrated type) is an inverse function of the current frequency. Also, the fluid circulation of the charge produced by the eddy currents increases with decreasing frequency of the supplied alternating current. Currents of 60 to 180 Hz. have been found satisfactory for the present method.

In performing the present method with the illustrated furnace, a heel of molten aluminum (preferably, an amount of molten aluminum equal to at least about 20% of the furnace capacity) is established within the crucible together with a small amount of salt flux for protecting the heel of metal from oxidation. Supply of alternating current to the power coil 12 produces eddy currents that generate heat in the heel. As will be understood, one purpose of the heel is to enable initial generation of heat in the furnace, and to this end the heel should be sufficiently large (in relation to the capacity of the furnace) to enable attainment of a significant portion of the full power (heat) output of the furnace.

After the furnace has been thus placed in operation, and during continuing passage of alternating current through the power coil, a substantial proportion of the flux to be used is added to the charge in the crucible. As stated above, for a given quantity of dross having a determined composition, it is preferred to use an amount of flux equal to about twice the weight of the nonmetallic portion of the dross. Further, it is presently preferred to add at least a major proportion (and indeed as much as about 75%) of the required flux to the molten metal heel in the furnace prior to introduction of the dross. The flux, which is a dry, particulate mixture of salts, is added slowly enough to avoid any significant reduction in temperature of the charge. The heat generated in the heel by induction melts the flux as it is added. Because the flux is poorly conductive to electricity and has a density (in the case of the illustrative flux composition described above) slightly less than that of aluminum, the molten flux assumes a hollow cylindrical shape within the crucible surrounding the molten metal heel and in effect isolating the metal portion of the charge from the crucible wall. The metal portion of the charge is indicated at 16 in the figure and the surrounding layer of molten salt flux is indicated at 17.

After the initial supply of flux has been introduced to and melted in the crucible, the dross to be treated is added to the furnace melt gradually, in successive increments so as not to suddenly or greatly alter the furnace temperature. This dross is absorbed into the melt very rapidly, and the circulation of the molten metal and salt flux provides the desired intimate contact between the flux and the newly added dross. The dross is heated, as presently believed, primarily by heat transfer from the heel which is itself heated by induction. Contained free metal of the dross melts from the heat of the furnace and coalesces in the body of molten aluminum already in the furnace as it is freed by the action of the flux from the surrounding nonmetallic matrix of the dross. If the flux becomes excessively viscous at normal operating temperature, some of the remaining flux is added to the melt. The operation is continued until all of the dross and flux has been supplied to the melt, and full absorption of the dross has occurred. Throughout this procedure, the flux acts to shield the metal in the charge (including the free metal of the dross) from air and thus to prevent loss of metal by oxidation.

Upon completion of this succession of steps, the furnace may be shut off. The molten metal and the flux containing nonmetallic components of the dross will separate clearly into discrete layers within the crucible, little if any metal being entrained in the mixture of flux and nonmetallics. The flux and nonmetallics are removed from the furnace by any appropriate procedure; and the molten metal thus separated from the dross may be readily removed from the furnace, as for casting into ingots or other use, by siphoning, tapping, decanting or any other convenient procedure. It is presently preferred that the molten flux and nonmetallics be removed first from the furnace, i.e. prior to removal of the molten metal; in any event, the flux and nonmetallics are removed at the conclusion of the furnace cycle of operation. Sufficient metal is left in the furnace to constitute the heel for the next cycle of operation.

As a further particular feature of the invention, the dross is so handled or treated, from the time it is skimmed off the surface of molten aluminum in the furnace in which it is formed up until the time it is introduced to the induction furnace, as to maintain in the dross a free metal content of at least about 50% by weight and preferably at least about 60% by weight. Chiefly, such preservation of free metal content involves prevention of oxidation of the metal in the dross. Although the dross when initially skimmed commonly has a free metal content in the range of about 60 to about 85% by weight, this free metal content is markedly decreased by oxidation especially if the dross is allowed to stand for any length of time in exposure to air and without being substantially cooled from the furnace temperature.

In this connection, it may be explained that the dross as skimmed is typically a pasty or granular material having many voids and is at a temperature usually between 600 and 800° C., depending on the temperature of the furnace from which it has been removed. Free aluminum in the dross will oxidize at such temperatures upon exposure to air penetrating the voids of the dross. Moreover, particularly in the case of dross at temperatures approaching 800° C., the dross may ignite and burn if indeed it is not already burning when skimmed. Such burning very rapidly increases the temperature of the dross up to as much as 2,000° C. and consumes free metal, thereby diminishing the recoverable free content of the dross.

Accordingly, it is preferred that the dross not be allowed to stand in air, without cooling, for more than one or two minutes after being skimmed. In some cases, maintenance of the desired free metal content of the dross may be achieved by transferring the dross immediately to the induction furnace from the furnace in which the dross has formed, i.e. delivering the dross to the induction furnace essentially as soon as it is skimmed. However, it may often be inconvenient or impossible to feed the freshly skimmed dross directly to an induction furnace.

To preserve the free metal content of dross that must stand for some extended period, the dross after skimming is immediately, rapidly and continuously quenched, so as to be cooled from the furnace temperature down to a temperature at least well below the melting point of aluminum and very preferably below 500° C. as quickly as possible, i.e. preferably within a period of not more than about five minutes or even less (a period of as little as two minutes being frequently practicable) after being skimmed from the furnace in which it has formed. For example, quenching may be effected by spreading the dross in a very thin layer over an extended surface so that the dross is cooled by exposure to air. Alternatively, the dross may be cooled by spraying with water or by contact with a chilled surface such as a water-cooled steel shaking table to which the dross is fed after being broken up mechanically. These procedures, however, are frequently attended with inconvenience especially in that the dross must be transported for some distance from the smelting furnace before it is quenched, and in some cases the described quenching treatments are even hazardous. Moreover, quenching by the procedures just mentioned is frequently only partially effective in preserving the free metal content of the dross; that is, even though the dross may initially contain 60% or more free metal, the free metal content after quenching by the foregoing procedures may be as low as 30-40%.

Accordingly, it is presently preferred to quench the dross by disposing it in layers covered by layers of a suitable salt, or mixture of salts, such as the mixture used to constitute the salt flux in the induction heating treatment of the dross. In this quenching procedure, as the dross is raked or skimmed from the furnace in which it is formed, it is placed in a steel bucket in layers alternating with layers of the salt. Thus, in an illustrative example, a layer of salt (e.g. the salt mixture used as the flux or one or more of the component salts of that mixture) in dry particulate form is placed on the bottom of the steel bucket which is to receive the dross. A layer of hot dross about six inches or less in thickness is placed in the bucket and covered with a further layer of the salt, one to two inches thick. Successive further layers of dross and salt are added to the bucket. For this quenching operation, about one pound of the salt is needed to quench four to six pounds of the dross.

The technique of cooling the dross by arranging it in layers separated by layers of salt very effectively quenches the dross, owing to the fact that the heat of the dross is taken up as heat of fusion in melting the salt. Virtually all burning or oxidation of metal in the dross after skimming can be avoided so that the free metal content of the dross after quenching remains in the range of 60-80% by weight. Use of the salt flux composition as the quenching medium is convenient in that the salt and dross can both be introduced to the induction furnace.

It is important that the layers of dross not be excessively thick, as the quenching action is dependent on transfer of heat from the dross to the salt. A very thick dross layer may ignite, and suffer loss of free metal through oxidation, even if covered with a layer of salt. Another reason for arranging the dross in relatively thin layers is to facilitate transfer of the dross to the induction furnace. Although soft and pasty or granular when hot, the dross solidifies into a more or less rigid mass upon quenching, and it is desirable that such mass be small enough for insertion into the induction furnace.

If desired, the dross as thus quenched may be transferred to the induction furnace while it is still relatively warm. However, the layered mass of salt and dross may be stored indefinitely if properly covered for protection from moisture as the salts and dross are somewhat hygroscopic. Hence it is important that the dross and salt mixture be shielded from atmospheric moisture during any prolonged storage.

Thus, in summary, the preferred practice of the invention includes the step of quenching the dross after skimming, preferably by the above-described salt-quenching technique, and heating the quenched dross by induction in the presence of a salt flux in the manner already described.

For any particular coreless induction furnace used in the method of the present invention, the ratio of salt and nonmetallic dross components to free metal in the furnace charge should be maintained below an upper limiting value determined by such factors as the design of the specific furnace and readily ascertainable by the operator. In this connection it may be explained that for any given quantity of molten aluminum in an induction furnace, increase in the quantity of molten flux and nonmetallics present in the charge increases the thickness of the cylindrical layer 17 of salt and nonmetallics in the crucible, and hence increases the distance between the molten metal column and the furnace wall. When this distance approaches the depth of penetration of the magnetic field of the coil 12 (a factor dependent on the frequency of the alternating current passed through the coil), the power input to the induction furnace is greatly reduced, with resultant decrease in both heating effect and fluid circulation of the charge. As stated, the practical limiting value of the salt and nonmetallics to metal ratio for any particular furnace can readily be ascertained by observation.

An especially important advantage of the invention, especially as practiced in a coreless induction furnace (e.g. of the type shown in the drawing, having an axially vertical arrangement of coil and crucible) is that there is little if any volatilization of salts from the flux at least at ordinary operating temperatures (below about 825° C.). Consequently, the present method obviates problems of air pollution heretofore encountered in dross-recovery operations of the prior art employing similar salt fluxes.

Without limiting the invention by any particular theory, it is at present believed that the foregoing advantage is attributable at least in part to the effects within the furnace which produce the special distribution of flux described above and shown in the drawing. Since the flux fills a hollow cylindrical space surrounding the metal heel laterally, the surface area of flux exposed to the atmosphere for any given volume of flux in the furnace is remarkably small; as shown in the drawing, the exposed salt surface is limited to a narrow annular area around the periphery of the charge, the metal of the heel being exposed in the central portion. This limitation of salt surface area minimizes volatilization as compared to other types of heating operation wherein the salt floats on the heavier metal, exposing an extended surface area of salt. Also, the present method (wherein fluid circulation resulting from eddy currents may provide much or all of the mixing action needed) avoids the vigorous tumbling or agitation (which may tend to promote volatilization) characteristic of previously known procedures employing equipment such as rotary furnaces. Thus, in short, in the practice of the present method by the described procedure, especially in the axially vertical coreless induction furnace shown, the benefits of use of a salt flux can be realized without the accompanying disadvantage of atmospheric pollution.

As stated above, the ordinarily preferred practice of the invention contemplates use of low-frequency current (e.g. 60 to 180 Hz.) and provision of a substantial heel in the furnace. However, it is possible to perform the method with high-frequency induction current (e.g. 10,000 Hz.) and in that case a heel is not necessary, sufficient heat being developed by eddy currents in the globules or particles of aluminum in the dross under treatment; but owing to the inverse relationship between frequency and depth of field penetration, high-frequency operation is performed in relatively small furnaces, e.g. furnaces less than about eight inches in diameter (for frequencies approaching 10,000 Hz.).

By way of further and more specific illustration of the method of the present invention, reference may be had to the following specific examples of operation:

EXAMPLE I

The procedures of this example are performed in a coreless induction furnace having an axially vertical refractory crucible 28 inches in diameter and about 51 inches deep, surrounded in its central portion by a water-cooled power coil made of hollow copper conductor, the coil being disposed in concentric relation to the crucible and extending for 31 inches along the axis of the crucible at a locality spaced from both the top and the bottom of the crucible. The described furnace is designed to operate on a frequency of 180 Hz. with a rated power output of 375 kilowatts and a capacity of one ton of aluminum metal.

In a furnace of this type, as already stated, it is found that the depth of penetration of the coil field into the charge varies inversely with the frequency of the alternating current through the coil. At 10 kHz., the depth of penetration of the field is about ¼ inch, while at 180 Hz. the depth of field penetration is three inches and increases to eight inches at 60 Hz. Similarly, the fluid circulation effect in the charge increases with decreasing frequency of the current through the coil, approximately doubling as the current frequency decreases from 180 Hz. to 60 Hz. For the described furnace dimensions and capacity, the depth of penetration and circulation effect provided by a 180 Hz. current through the coil is sufficient to afford satisfactory operation.

In a typical instance of practice of the present method with the described furnace, for treatment of dross to recover free aluminum metal contained in the dross, a heel comprising a molten body of aluminum having a weight of between about 400 and about 500 pounds is established in the crucible while the furnace is at a temperature between about 720° and about 740° C., with the furnace power turned off. About 20–30 pounds of flux (45% KCl, 50% NaCl, 5% NaF by weight) are added to the heel, to protect the heel from burning, and the furnace power is turned on to heat the heel by induction to a temperature of about 850–860° C. To treat 600 pounds of dross having a free aluminum metal content of about 70% by weight (i.e. comprising about 420 pounds of free metal and 180 pounds of nonmetallic components), 360 pounds of salt flux (two pounds for each pound of nonmetallics in the dross) are used. The salt flux has the same composition as the aforementioned flux initially added to the heel, and is supplied in dry particulate form.

About 75% of the required flux (i.e. 270 pounds) are added gradually to the heel in the furnace while furnace operation continues, the flux being added slowly enough so that the furnace temperature does not fall substantially below 800° C. When the added flux is fully molten, the dross is fed to the furnace in increments of about 30 to about 40 pounds at a rate sufficiently low so that the furnace temperature is maintained at about 800°C. The dross is absorbed into the melt, separating into free metal which coalesces in the heel, and nonmetallics which become mixed with the salt flux. Additional salt flux is added from time to time, to prevent the mixture of salt and nonmetallics from becoming excessively thick, until the full amount of flux has been utilized.

When all of the flux and dross have been fed to the furnace, the furnace power is turned off. The molten metal separates from the mixture of salt flux and nonmetallic dross components, the metal being in the lower portion of the crucible. The salt and nonmetallics may readily be removed by decanting, and the molten metal may be used as the heel for treatment of further quantities of dross, with corresponding further additions of salt flux, until the melt reaches a level within about twelve inches of the top of the crucible. At this point, the flux and nonmetallics from the dross are removed from the furnace, and recovered metal is decanted and cast into ingots or otherwise used, leaving 400–500 pounds of molten aluminum in the furnace to constitute the heel for the next cycle of furnace operation.

Preferably, the dross is quenched with salt flux immediately after being skimmed from the smelting or other furnace in which it is formed, so as to preserve the free metal content of the dross until introduction thereof to the induction furnace. As an example of such quenching process, the dross is deposited in a steel bucket of appropriate dimensions (preferably not larger than the induction furnace crucible) as soon as it is removed from the smelting furnace by skimming. Initially, for collection of 600 pounds of dross, about 25 pounds of the salt flux in particulate form are placed in the bottom of the steel bucket. About 100–150 pounds of dross are skimmed into the bucket and then a further addition of about 20–40 pounds of salt is made to provide a layer covering this dross. Additional alternate layers of dross and salt in about the same relative proportions are added to the bucket until the skimming operation is completed. Thus in the bucket there are provided a succession of alternate layers of dross and salt with a salt-to-dross ratio of about .2 to about .25. The salt, absorbing heat from the hot dross, rapidly quenches the dross, reducing the dross temperature to well below 500° C. in less than a minute after skimming from the furnace.

Utilizing the above-described induction furnace, with various quenching treatments for the dross prior to induction heating, 32,000 pounds of dross from smelting of various aluminum alloys were treated in accordance with the present invention. The total metal recovered, based on weight of the dross, was about 68%, and this is believed to be well in excess of 90% of the free metal content of the dross as supplied to the induction furnace. The average processing time in the induction furnace was 21–22 minutes per 100 pounds of dross; the average power consumption in the induction furnace was 130 kw.-h. per 100 pounds of metal recovered, and the average consumption of salt flux was ½ pound of salt per pound of dross. For dross quenched with salt flux after skimming in accordance with the procedure just described, the average recovery of metal based on the weight of the dross was 70–73%, and the average power consumed in the induction furnace was 105–118 kw.-h. per 100 pounds of metal recovered.

The following table compares results obtained in treating dross from various different aluminum alloys, utilizing the salt quench technique for cooling the dross after skimming. The alloys are identified by Aluminum Association designation and by principal alloying element. Metal recovery is indicated as percent of weight of dross.

| Alloy | Test | Average recovery, percent | No. of trials |
|---|---|---|---|
| 1050 (pure Al) | A | 71 | 4 |
|  | B | 73 | 3 |
| 3003 (Mn) | A | 80 | 4 |
|  | B | 76 | 5 |
| 5005 (Mg) | A | 68 | 2 |
|  | B | 67 | 3 |

In each case, test A dross was treated in the induction furnace after only partial cooling by quenching, while test B dross was completely cooled before treatment in the induction furnace.

Other materials comprising or containing aluminum metal may be added to the induction furnace along with, or after, the dross. Examples of such materials are aluminum scalpings and aluminum saw chips. During operation of the furnace, molten aluminum from these materials augments the body of metal in the crucible.

EXAMPLE II

Skimmings of aluminous dross from a furnace were placed in a crucible and covered immediately with a flux comprising 45% KCl, 50% NaCl, and 5% NaF. The cooled mixture was transferred to a graphite crucible of an induction furnace (this latter crucible having an internal diameter of about six inches and height of about eighteen inches), and heated by electrical induction, with a current of 9,000 Hz. frequency supplied to the furnace induction coil by a suitable source at about 20 kw. output.

In two runs, the following results were obtained (values approximate):

|  | Run | |
|---|---|---|
|  | First | Second |
| Weight of dross treated, pound | 15 | 6.7 |
| Power, kilowatt (maximum) | 20 | 20 |
| Heating time (from room temperature to complete separation), minutes | 30 | 23 |
| Flux consumption, pound: |  |  |
| Total | 6.4 | 3.5 |
| Per pound of metal recovered | 0.5 | 0.6 |
| Metal recovery: |  |  |
| Total, pounds | 12.7 | 5.4 |
| Percent (of weight of dross) | 80 | 81 |

It is estimated that the recovered metal represented about 95% of the free metal in the dross.

In some instances of practice of the present method, especially for treatment of dross having a relatively low free metal content (e.g. a content of 30–40%), it may be desirable to crush and screen the dross prior to introduction of the dross to the induction furnace. It is found that by separating and removing the fines from crushed aluminous dross (for example, removing the −20 mesh particle size fraction of the crushed dross), there is left a larger particle size fraction having a substantially higher free metal content than the dross prior to crushing and separation. This larger particle size fraction is fed to an induction furnace for treatment in accordance with the present invention. The term "dross" as used herein embraces a large particle size fraction of crushed dross prepared by the procedure just described.

It is to be understood that the invention is not limited to the features and embodiments hereinabove specifically set forth but may be carried out in other ways without departure from its spirit.

We claim:

1. A method of recovering aluminum metal from a quantity of dross formed on a molten aluminum surface and including at least about 50% free metal in mixture with nonmetallic compounds, comprising
    (a) removing the dross from the molten surface and
    (b) heating the dross by electrical induction to a temperature above the melting point of the metal in the presence of a quantity of a salt flux that is molten at said temperature, while
    (c) maintaining the free metal content of said dross at least at about 50% after removal of said dross from said molten surface until said dross is heated by induction as aforesaid.

2. A method according to claim 1, further including the step of establishing a heel of molten aluminum in an induction furnace, and wherein said flux and said dross are supplied to said heel in said furnace for the step of heating said dross.

3. A method of recovering aluminum metal from a quantity of dross formed on a molten aluminum surface and including at least about 50% free metal in mixture with nonmetallic compounds, comprising
    (a) removing the dross from the molten surface;
    (b) immediately, rapidly and continuously cooling the dross to a temperature below the melting point of aluminum; and
    (c) heating the dross by electrical induction to a second temperature above the melting point of the metal in the presence of a quantity of a salt flux that is molten at said said temperature.

4. A method according to claim 3, wherein said step of cooling said dross comprises bringing the dross into contact with a solid particulate salt for transfer of heat from the dross to the salt.

5. A method according to claim 4, wherein said salt flux is a mixture of salts, and wherein the salt that is brought into contact with the dross for cooling the dross comprises at least one component of said flux.

6. A method of recovering aluminum metal from a quantity of dross containing the same in mixture with nonmetallic compounds, comprising:
    (a) establishing a heel of molten aluminum in an induction furnace, and
    (b) continuously heating and causing fluid circulation within said heel in said furnace by electrical induction while
    (c) first supplying to said heel in said furnace a quantity of a salt flux that melts upon contact with the heated heel, said heel and flux forming substantially discrete molten bodies within said furnace, and while
    (d) subsequently introducing said dross to said furnace for heating and mixture with said heel, aluminum metal of said dross coalescing with said heel and nonmetallic compounds of said dross becoming mixed with said flux in said furnace.

7. A method of recovering aluminum metal from a quantity of dross containing the same in mixture with nonmetallic compounds by heating the dross in the presence of a quality of salt flux, comprising.
    (a) establishing a heel of molten aluminum in an induction furnace, and
    (b) continuously heating and causing fluid circulation within said heel in said furnace by electrical induction while
    (c) first supplying to said heel in said furnace a substantial proportion of said quantity of salt flux, said flux melting upon contact with the heated heel and said heel and flux forming substantially discrete molten bodies within said furnace, and while (d) subsequently introducing said dross and the remainder of said quantity of flux to said furnace for heating and mixture with said heel, aluminum metal of said dross coalescing with said heel and nonmetallic compounds of said dross becoming mixed with said flux in said furnace.

8. A method according to claim 7, wherein said quantity of flux is at least about equal in weight to the amount of nonmetallic compounds present in said quantity of dross.

9. A method according to claim 8, wherein said quantity of flux is equal in weight to about twice the amount of nonmetallic compounds present in said quantity of dross.

10. A method according to claim 7, wherein said flux comprises a mixture of salts having a melting point below the temperatures to which said heel is heated.

11. A method according to claim 10, wherein said flux comprises a mixture of sodium chloride and potassium chloride and contains a minor proportion of a fluoride.

12. A method according to claim 7, wherein said dross forms on a molten aluminum surface and includes at least about 50% free metal, said method further including the steps of removing the dross from the molten surface and maintaining the free metal content of the dross at least at about 50% after removal of the dross from the molten surface until the dross is introduced to said induction furnace.

13. A method according to claim 7, wherein said dross forms on a molten aluminum surface, said method further including the steps of removing the dross from the molten surface and immediately, rapidly and continuously cooling the dross to a temperature below the melting point of aluminum.

14. A method according to claim 13, wherein said step of cooling the dross comprises bringing the dross into contact with a solid particulate salt for transfer of heat from the salt to the dross.

15. A method according to claim 14, wherein the salt that is brought into contact with the dross for cooling the dross has the same composition as said salt flux.

16. A method according to claim 7, wherein said furnace comprises an axially vertical vessel surrounded by an axially vertical coil through which alternating current is passed, passage of current through said coil causing said flux to be distributed within said vessel in laterally surrounding relation to said heel.

References Cited

UNITED STATES PATENTS

| | | | |
|---|---|---|---|
| 1,180,435 | 4/1916 | Robison | 75—65 R |
| 1,292,582 | 1/1919 | Coulson | 75—65 R |
| 1,519,204 | 12/1924 | Hess | 75—24 X |
| 1,950,967 | 3/1934 | Bonsack | 75—68 R |
| 2,170,863 | 8/1939 | Junker | 75—65 R |
| 2,375,049 | 5/1945 | Tama et al. | 75—10 R |
| 2,787,592 | 4/1957 | Burkhardt | 75—68 R |
| 3,436,212 | 4/1969 | Hess | 75—68 R |
| 3,495,019 | 2/1970 | Santi | 75—68 R |

FOREIGN PATENTS

| | | | |
|---|---|---|---|
| 175,242 | 11/1922 | Great Britain | 75—68 R |
| 297,635 | 9/1928 | Great Britain | 75—68 R |
| 686,037 | 1/1953 | Great Britain | 75—68 B |

OTHER REFERENCES

Tama: Article in The Iron Age, Sept. 4, 1947; pp. 76–79.

HENRY W. TARRING II, Primary Examiner

U.S. Cl. X.R.

75—10, 24, 65